(12) United States Patent
Bishop et al.

(10) Patent No.: US 12,460,181 B2
(45) Date of Patent: Nov. 4, 2025

(54) MEMBRANE COVERAGE AND ORIENTATION AND METHODS, COMPOSITIONS, AND KITS RELATED THERETO

(71) Applicant: GEORGE MASON UNIVERSITY, Fairfax, VA (US)

(72) Inventors: Barney Bishop, Annandale, VA (US); Mrinalini Ramanan, Fairfax, VA (US)

(73) Assignee: GEORGE MASON UNIVERSITY, Fairfax, VA (US)

( * ) Notice: Subject to any disclaimer, the term of this patent is extended or adjusted under 35 U.S.C. 154(b) by 985 days.

(21) Appl. No.: 16/872,639

(22) Filed: May 12, 2020

(65) Prior Publication Data

US 2020/0362307 A1 Nov. 19, 2020

Related U.S. Application Data

(60) Provisional application No. 62/847,982, filed on May 15, 2019.

(51) Int. Cl.

| | |
|---|---|
| *A61K 9/00* | (2006.01) |
| *A61K 47/69* | (2017.01) |
| *A61K 49/00* | (2006.01) |
| *C07D 271/12* | (2006.01) |
| *C12N 5/00* | (2006.01) |
| *C12N 5/078* | (2010.01) |
| *C12N 15/88* | (2006.01) |
| *G01N 21/64* | (2006.01) |
| *G01N 33/50* | (2006.01) |
| *G01N 33/543* | (2006.01) |
| *G01N 33/554* | (2006.01) |
| *G01N 33/58* | (2006.01) |

(52) U.S. Cl.
CPC ........ *C12N 5/0641* (2013.01); *A61K 47/6915* (2017.08); *A61K 49/0084* (2013.01); *C07D 271/12* (2013.01); *C12N 5/0006* (2013.01); *C12N 15/88* (2013.01); *G01N 21/6428* (2013.01); *G01N 33/5094* (2013.01); *G01N 33/5432* (2013.01); *G01N 33/554* (2013.01); *G01N 33/586* (2013.01); *G01N 2021/6432* (2013.01); *G01N 2021/6439* (2013.01)

(58) Field of Classification Search
None
See application file for complete search history.

(56) References Cited

U.S. PATENT DOCUMENTS

| | | | |
|---|---|---|---|
| 8,962,344 B2 | 2/2015 | Groves et al. | |
| 10,053,484 B2 | 8/2018 | Mao et al. | |
| 2015/0045291 A1* | 2/2015 | Shai | C07K 14/005 |
| | | | 435/375 |
| 2018/0120299 A1* | 5/2018 | Nishibu | C07K 17/00 |

FOREIGN PATENT DOCUMENTS

| | | | | |
|---|---|---|---|---|
| WO | WO-2009117370 A1 * | 9/2009 | ....... | G01N 33/54313 |
| WO | WO-2018187287 A1 * | 10/2018 | ......... | A61K 48/0033 |

OTHER PUBLICATIONS

Wang et al., J. Am. Chem. Soc. 2018, 140, 3505-3509. (Year: 2018).*
Guo et al., "Erythrocyte Membrane-Enveloped Polymeric Nanoparticles as Nanovaccine for Induction of Antitumor Immunity against Melanoma", ACSNANO, 2015, vol. 9, No. 7, pp. 6918-6933.
Hu et al., "Erythrocyte membrane-camouflaged polymeric nanoparticles as a biomimetic delivery platform", PNAS, Jul. 5, 2011, vol. 108, No. 27, pp. 10980-10985.
Plamont et al., "Small fluorescence-activating and absorption-shifting tag for tunable protein imaging in vivo", PNAS, Jan. 19, 2016, vol. 113, No. 3, pp. 497-502.
Schwartz et al., "Fluorogen-Activating Proteins Provide Tunable Labeling Densities for Tracking FcεRI Independent of IgE", ACS Chem. Biol., 2015, vol. 10, pp. 539-546.
Szent-Gyorgyi et al., "Fluorogen-activating single-chain antibodies for imaging cell surface proteins", Nature Biotechnology, Feb. 2008, vol. 26, No. 2, pp. 235-240.

* cited by examiner

*Primary Examiner* — Susan T Tran

(74) *Attorney, Agent, or Firm* — Saul Ewing LLP; Alireza Behrooz

(57) ABSTRACT

Cells and lipid-based structures are described herein, in particular cells and lipid-based structures comprising membrane portions derived from cells having a label covalently attached thereto, as are compositions and kits comprising such cells and structures, and methods for using the cells and structures, in particular for determining membrane coverage and/or orientation as well as for screening methods/assays, and the like.

5 Claims, 4 Drawing Sheets

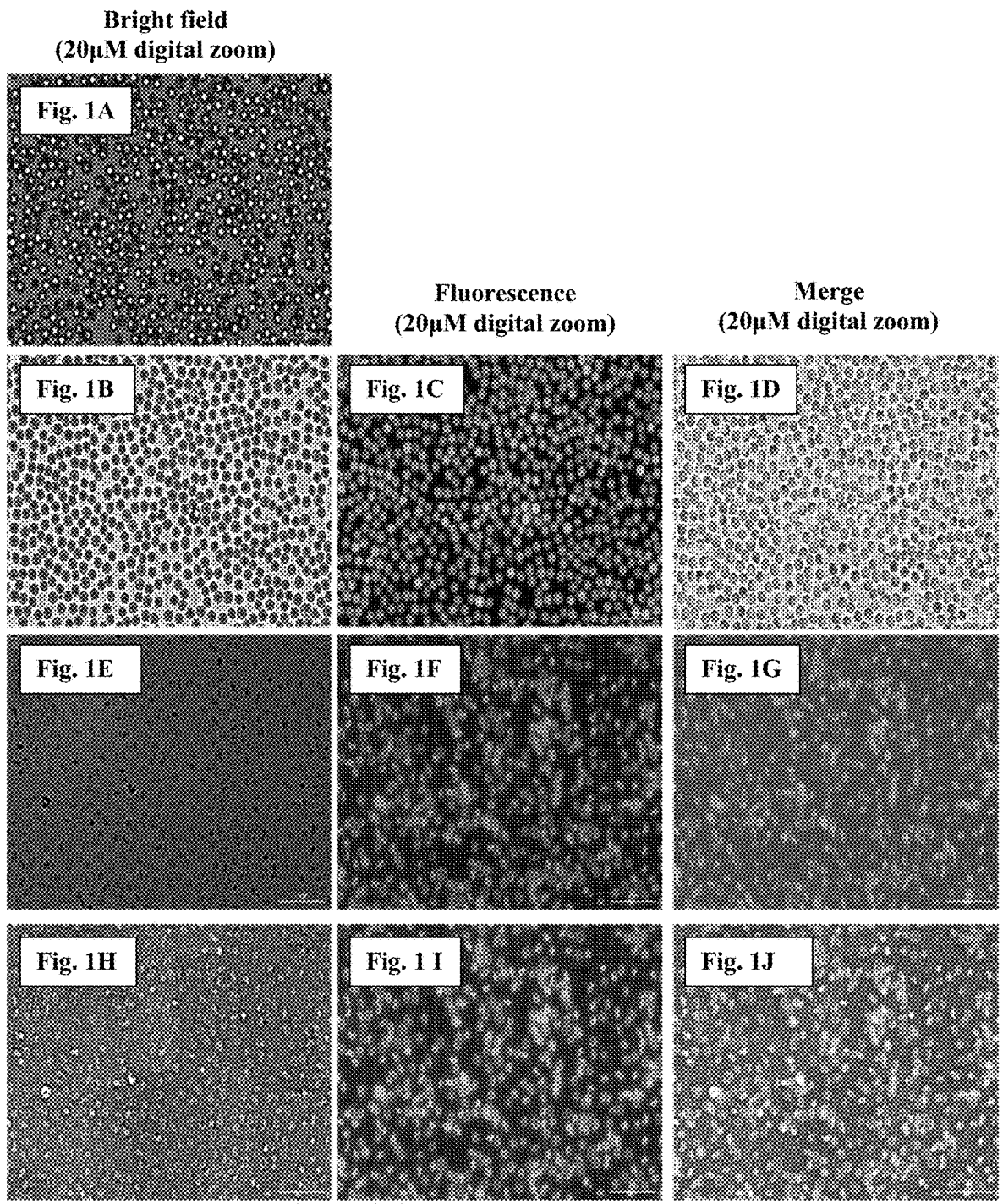

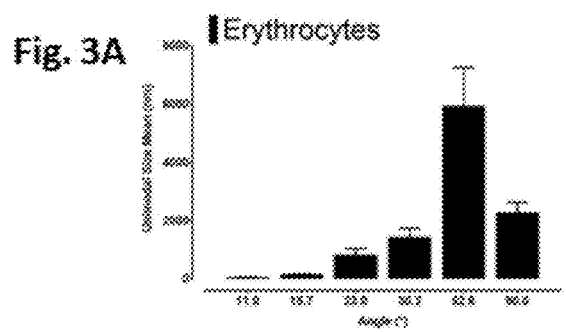
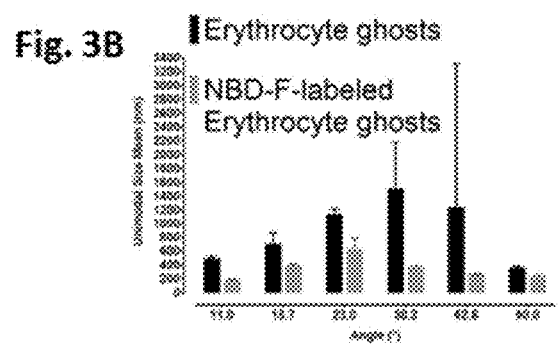
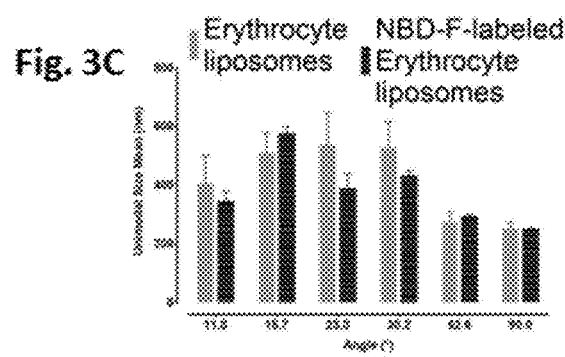
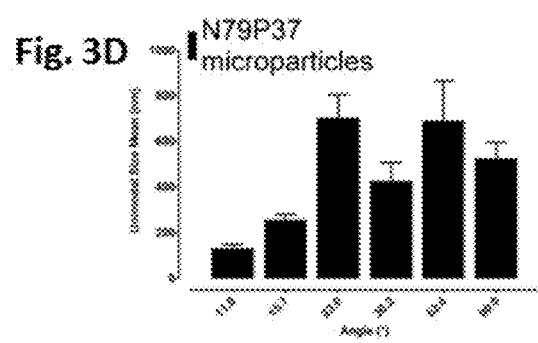
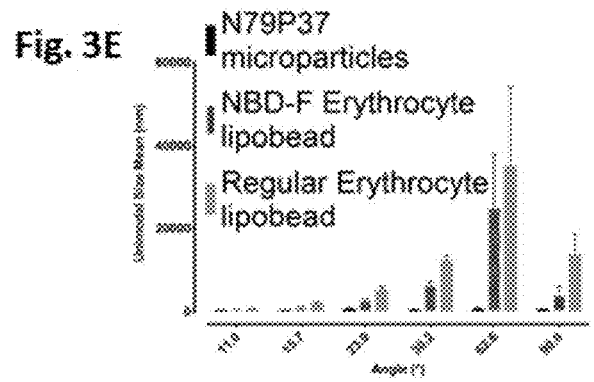
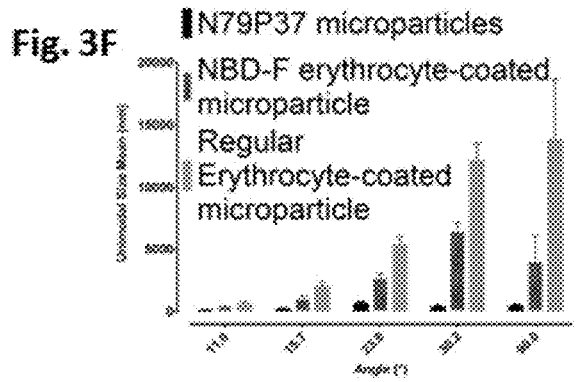

MEMBRANE COVERAGE AND ORIENTATION AND METHODS, COMPOSITIONS, AND KITS RELATED THERETO

CROSS-REFERENCE TO RELATED APPLICATION

This non-provisional application claims the benefit under 35 U.S.C. § 119(e) to U.S. Provisional Application No. 62/847,982, filed on May 15, 2019, which is hereby expressly incorporated by reference into the present application.

FIELD OF THE INVENTION

The present invention relates to cells and lipid-based structures comprising membrane portions derived from cells, and to compositions, methods, and kits comprising such cells and/or structures.

BACKGROUND

The phospholipid bilayer of a cell membrane contains varying proteins on the outer compared to the inner leaflet, displaying distinct interactive elements on the outside of the cell membrane compared to the inside of a cell membrane. This distinction is crucial, in particular for technologies and applications that rely on a proper orientation of cell membranes, as ligand specificity and physiological relevance may depend on proper orientation. For example, it is imperative to monitor whether the location of membrane proteins is preserved when creating membrane-encapsulated microparticles, and current methods that create such particles rely on e.g., antibody recognition to investigate membrane orientation validation, which can significantly limit the number of proteins and cell types that can be effectively monitored and/or utilized.

There is a need for new and effective methods and compositions for monitoring whether membrane orientation is preserved, as well as for more practical solutions for analysis of membrane orientation e.g., to enable screening test agents that interact with cell membrane proteins.

SUMMARY OF THE INVENTION

In some aspects, the present invention provides a lipid-based structure. The lipid-based structure comprises a lipid bilayer having a membrane portion derived from a plasma membrane of a cell. The lipid bilayer isolates an interior space of the structure from an external environment. At least one membrane protein having an extracellular domain covalently attached to a label is associated with the plasma membrane of the cell.

In other aspects, the present invention provides a method for preparing the lipid-based structure described herein. The method comprises covalently and non-specifically attaching the label to the extracellular domain of the at least one membrane protein associated with the plasma membrane of the cell; and providing the lipid bilayer having the membrane portion derived from the plasma membrane of the cell.

In one aspect, the present invention provides a lipid-based structure prepared by the methods described herein.

In another aspect, the present invention provides compositions and kits comprising the lipid-based structure of the invention.

In other aspects, the present invention provides a method for determining membrane orientation of the lipid-based structure described herein. The method comprises determining an amount of a signal emitted by the label from a test sample comprising the structure, whereby an amount of quenching of the signal is indicative of the orientation of the membrane portion.

In some aspects, the present invention provides a method for determining membrane coverage of the lipid-based structure of the invention. The method comprises comparing the amount of a signal emitted by the label from a test sample comprising the structure with an amount of a signal emitted from a reference sample comprising a reference structure, whereby a reduced signal emission from the test sample as compared to signal emission from the reference sample is indicative of a reduced membrane coverage of the structure relative to membrane coverage of the reference structure.

In one aspect, the present invention provides a method for monitoring whether the polarity of a host membrane is preserved during preparation of the lipid-based structure of the invention. The method comprises covalently attaching the label to the extracellular domain; preparing the lipid-based structure; and determining an amount of a signal emitted by the label from a test sample comprising the structure, whereby an amount of quenching of the signal is indicative of the orientation of the membrane portion.

In another aspect, the present invention provides a method for determining whether an agent impacts membrane orientation. The method comprises
  introducing the agent to:
    a cell, wherein at least one membrane protein having an extracellular domain covalently attached to a label is associated with a plasma membrane of the cell; or
    a lipid-based structure, wherein the lipid-based structure comprises a lipid bilayer having a membrane portion derived from the plasma membrane of the cell, wherein the lipid bilayer isolates an interior space of the structure from an external environment; and
  determining an amount of a signal emitted by the label from a test sample comprising the cell or the lipid-based structure, whereby an amount of quenching of the signal is indicative of the impact of the agent on membrane orientation.

BRIEF DESCRIPTION OF THE DRAWINGS

FIGS. 1A-1J are microscopy images showing bright field and fluorescence images of (A) erythrocytes; (B, C, D) 4-Fluoro-7-nitrobenzofurazan (NBD-F) labeled erythrocytes; and (E, F, G) NBD-F labeled ghosts. Digital phase contrast is used to display NBD-F labeled ghosts in greater detail (H, I, J).

FIGS. 3A-3F are graphs showing multi angle light scattering (MALS) assays on (A) Unlabeled and NBD-F-labeled Erythrocytes, (B) Unlabeled and NBD-F-labeled Erythrocyte ghosts, (C) Unlabeled and NBD-F-labeled Erythrocyte liposomes, (D) Notebook 79 Page 37 (N79P37) microparticles used as architectural supports, (E) Unlabeled and NBD-F-labeled Erythrocyte coated microparticles with reference to N79P37 microparticles (black) and (F) Omission of 62.6° angle data for more detailed representation of other five angles.

DETAILED DESCRIPTION OF THE INVENTION

Figure 2A:
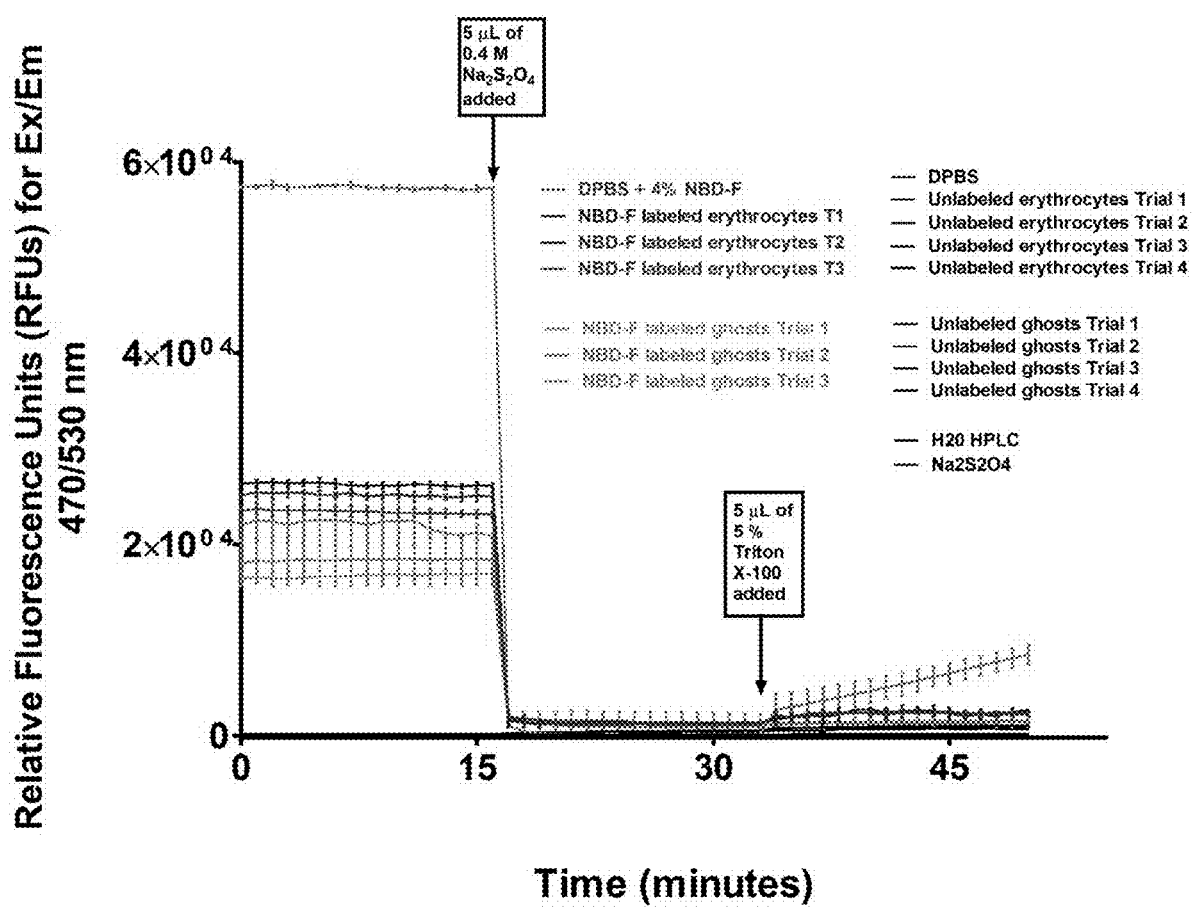
FIGS. 2A-2B are graphs showing fluorescence quenching by sodium dithionite ($Na_2S_2O_4$) on (A) erythrocytes and erythrocyte ghosts with and without 4-Fluoro-7-nitrobenzofurazan (NBD-F) labels; and (B) microparticles used for incubation with both unlabeled and NBD-F-labeled erythrocyte vesicles.

In one aspect, the present invention provides a lipid-based structure comprising a lipid bilayer having a membrane portion derived from a plasma membrane of a cell, wherein the lipid bilayer isolates an interior space of the structure from an external environment, wherein at least one membrane protein having an extracellular domain covalently attached to a label is associated with the plasma membrane of the cell.

In some embodiments, the at least one membrane protein is associated with the membrane portion.

In other embodiments, the lipid bilayer comprises a single lipid bilayer (unilamellar).

As used herein, the phrase "derived from" refers to the cell source or origin of the membrane portion. The manner of deriving does not matter for the purpose of the invention unless specifically stated otherwise.

The membrane portion can be derived from any cell having the plasma membrane. Examples include, but are not limited to eukaryotic cells (e.g., mammalian cells; yeast cells) as well as prokaryotic cells.

In some embodiments, the cell can be obtained from blood or organ tissue or can be part of a cell culture, e.g., cells grown in suspension or cells cultured on a tissue culture surface and include both adherent and non-adherent cells.

In other embodiments, the cell may also be from pathological tissues, including but not limited to tumors and cancer cells. Cells may also be from cell lines which are either transiently or stably expressing proteins of interest, which may or may not normally be expressed in these particular cell lines.

In one embodiment, the cell is a mammalian cell.

Non-limiting examples of mammalian cells include red blood cells (erythrocytes), fibroblast cells, kidney cells, chondrocytes, osteocytes, adipocytes, myocytes, chromaffin cells, neuronal cells, embryonic cells, mesenchymal stem cells (MSCs), lymphocytes and other immunologically originated cells.

In some embodiments, the cell is a non-terminally differentiated or pluripotent stem cell.

In other embodiments, the cell is a hematopoietic stem cell, bone marrow stem cell, mesenchymal stem cell, cardiac stem cell, or neural stem cell.

Non-limiting examples of cells of cell lines include CHO cells, HEK293 cells, COS-7 cells, HeLa cells, NIH3T3 cells, MCF-7 cells, Jurkat cells and RAW264 cells.

In some embodiments, the cell is a red blood cell (erythrocyte).

The lipid-based structure is generally any structure, such as, for example, a cell ghost, liposomal vesicle, extracellular vesicle (EV), or coated particle, having the membrane portion derived from the cell. In this manner, the structure may display one or more components (e.g. proteins, carbohydrates, etc.) of the plasma membrane of the cell.

In some embodiments, a component of the membrane portion mimics the orientation found on the native cell with the component that naturally faces the external environment on the outside of the structure (facing the external environment) and the component that naturally faces the cytosol of the cell on the inside of the structure (facing the interior). Those components of the lipid bilayer that face the external environment would be accessible to various agents, probes and/or conditions (e.g. pH). For example, in one embodiment, the membrane portion of the structure displays the label in a manner that is solvent accessible e.g., accessible to quenching, interacting, binding and/or targeting, etc.

In other embodiments, a component of the membrane portion does not mimic the orientation found on the native cell with the component that naturally faces the external environment on the inside of the structure (facing the interior) and the component that naturally faces the cytosol of the cell on the outside of the structure (facing the external environment). Those components of the lipid bilayer that face the interior would not be accessible to various agents, probes and/or conditions (e.g. pH). For example, in one embodiment, the membrane portion of the structure displays the label in a manner that is not solvent accessible e.g., inaccessible to quenching, interacting, binding and/or targeting, etc.

In some embodiment, the lipid-based structure is a cell ghost, wherein the at least one membrane protein is associated with the membrane portion of the cell ghost.

In other embodiments, the lipid-based structure is a cell ghost in which at least some or all of the intracellular content of the native, whole cell has been emptied from the cell without significant rupture of the plasma membrane of the cell. In some embodiments, the lipid-based structure is a cell ghost in which the plasma membrane of the cell has been opened, the cell emptied of at least some or all of the intracellular content, and then the membrane is re-assembled and sealed to form the ghost.

In one embodiment, the lipid-based structure is an erythrocyte ghost.

There are at least two general types of erythrocyte ghosts, namely white ghosts, in which the hemoglobin is removed from the red blood cell without significant rupture of the membrane, and resealed ghosts, in which the membrane is transiently opened, cellular content removed, and membrane allowed to reseal. Either one of the two types, or a mixture of the two, is contemplated by the present invention. The preparation of white ghosts and resealed ghosts are described by e.g., Schow, G., and Passow, H., Molecular and Cellular Biochemistry, 2:197-217 (1973) and Rohling, O., and Neidhart, B., Anal. Chem. 1999, 71, 1077-1082, each of which is herein incorporated by reference for their disclosure of preparing erythrocyte ghosts.

In another embodiment, the lipid-based structure is a vesicle, wherein the at least one membrane protein is associated with the membrane portion of the vesicle.

In some embodiments, the vesicle is a structure that is artificially prepared from cellular plasma membranes. For example, in one embodiment, liposomal vesicles of desired sizes can be readily prepared by a variety of methods/processes known in the art for preparing liposomal vesicles including but not limited to e.g., techniques whereby membrane ghosts are first prepared by removing the intracellular contents of the native, whole cell followed by preparation of liposomal vesicles of desired sizes e.g., by extrusion of the ghost through an extruder to form the liposomal vesicles.

In one embodiment, the vesicle is a liposomal vesicle.

In other embodiments, the structure is a vesicle released by a cell e.g., by way of natural shedding and/or budding from the cell, wherein the at least one membrane protein is associated with the membrane portion of the vesicle.

In another embodiment, the vesicle is an extracellular vesicle (EV).

In some embodiments, the EV is an exosome or a microvesicle.

One of ordinary skill in the art knows that exosomes are EVs that may be released from a cell by the endocytic pathway (e.g., by inward budding of plasma membranes followed by their release into the extracellular space) and that can sometimes range from about 30 nm to about 100 nm in diameter and may contain host (and pathogen)-derived nucleic acid, protein and/or lipid cargos. Microvesicles (also known as shedding vesicles, ectosomes or microparticles), are an art-recognized distinct type of EV that can form by the outward budding of the plasma membrane of a cell and that are sometimes about 100 to about 1000 nm in diameter.

In other embodiments, the vesicle is a microvesicle (MV) comprising fragments of plasma membrane shed from the cell during activation and/or apoptosis (e.g., apoptotic bodies).

In one embodiment, the vesicle is a virus particle.

In another embodiment, the vesicle is a virus-like particle (VLP). For example, VLPs can be formed in vitro upon expression, in a cell, of viral surface glycoprotein, e.g. GP, and a virion structural protein, e.g., VP40, or portions thereof.

In another embodiment, the vesicle is a bacterial outer membrane vesicle (OMV), wherein the at least one membrane protein is associated with the membrane portion of the OMV.

In other embodiments, the lipid-based structure is a microarray, wherein the at least one membrane protein is associated with the membrane portion of the microarray. In one embodiment, the membrane portion forms a planar lipid bilayer membrane arrayed on a support e.g., on fused glass or silica. U.S. Pat. Nos. 6,699,719 & 6,228,326 and Groves et al., Science, 275:651-653 (1997), which are herein incorporated by reference for their disclosure of arrayed planar bilayer membranes, describe a surface detector device for arraying phospholipid membranes that are planar lipid bilayer membranes (either synthetic or native cell membranes) arrayed on fused silica, which can be configured for high throughput assays, for example. As known in the art, liposomes (e.g., liposomes having diameters ranging from about 25 nm to about 5 μm; also referred to as small unilamellar vesicles (SUVs)) can fuse with e.g., glass or silica to generate planar lipid bilayers (Brian and McConnell (1984) Proc. Natl. Acad. Sci. U.S.A., 81:6159-6163; Groves and Boxer (2002) Acc. Chem. Res., 35:149-157, each of which is herein incorporated by reference for its disclosure of planar lipid bilayers fused with e.g., glass or silica and methods related thereto).

In one embodiment, the lipid-based structure is a closed structure having an aqueous core e.g., a water-based liquid medium or composition.

In one embodiment, the lipid-based structure further comprises a particle at least partially surrounded by the lipid bilayer.

In other embodiments, the lipid bilayer encapsulates the particle in the interior of the structure. In some embodiments, those membrane portion component(s) that face the interior of the structure face a surface of the particle.

In one embodiment, the lipid bilayer is separated from the particle by an aqueous film. The aqueous film may be any suitable aqueous solution, including, but not limited to, a buffered saline solution (e.g. Phosphate Buffered Saline (PBS)). The aqueous film may contribute to the long-range lateral fluidity of a transmembrane protein. In another embodiment, the aqueous film is not deleterious to lipids, membrane components and/or the components of the particle. In some embodiments, the aqueous film is about 0.1 nm to about 2.0 nm in thickness, preferably about 0.5 nm to about 1.5 nm. In one embodiment, the aqueous film is about 1 nm thick.

In one embodiment, the particle is a microparticle or nanoparticle.

In another embodiment, the particle is a bead.

In some embodiments, the particle is formed from any lipid bilayer-compatible material. In another embodiment, at least the outer surface of the particle is formed of a lipid bilayer-compatible material.

The particle may be composed of a variety of materials, including but not limited to silica, glass, borosilicate glass, polystyrene, polymethylmethacrylate, as well as nanoparticles (e.g. metallic, semiconducting, organic, or inorganic (e.g. including but not limited to gold (Au)). The particle may be composed of a single material or of more than one material.

In some embodiments, the particle comprises silica, metal oxides, or organic materials such as polysaccharides, polystyrene, polyelectrolyte capsules, or hydrogels.

In another embodiment, the particle is a polymeric particle.

In one embodiment, the particle comprises poly(lactic acid) (PLA) or poly(lactic-co-glycolic acid) (PLGA).

In some embodiments, the particle comprises a core formed by a crosslinked polymer network. In one embodiment, the crosslinked polymer network comprises crosslinked units of a vinylic functional monomer. In another embodiment, the crosslinked polymer network comprises crosslinked units of N-tert-Butylmethacrylamide (tBMAm). In some embodiments, the core has a core diameter of about 500 nm or less.

In other embodiment, the particle comprises the core, wherein the particle further comprises a polymeric shell at least partially surrounding the core. In one embodiment, the polymeric shell is covalently connected to the core. In some embodiments, the polymeric shell comprises crosslinked units of a second monomer. In other embodiments, the second monomer comprises N-methacryloyl-6-aminohexanoic acid (MA6AHA). In one embodiment, the particle has a total particle diameter of about 800 nm or less.

In other embodiments, the particle can be obtained from a commercial source.

In one embodiment, the particles may be doped with any of a number of different positively- or negatively-charged ions in order to assist with coating of the particles. In another embodiment, the particles may be pre-coated with functional amine silanes to enhance stability of a lipid bilayer.

In some embodiments, the particles are spherical. In other embodiments, the particles can be any suitable geometric shape, including, but not limited to spheroid, ovoid, polygonal, cylindrical, etc. In another embodiment, all particles in a batch are of the same or similar geometric shape. In other embodiments, the particles are geometrically identical or substantially similar. In some embodiment, particles or beads can measure in colloidal dimensions of about 0.5 to about 50 μm in diameter, although in other embodiments, nanoparticle size (about 50 nm to about 1 μm) and larger (up to about 1 mm) size is also contemplated.

In other aspects, the present invention provides a cell comprising a plasma membrane, wherein at least one membrane protein having an extracellular domain covalently attached to a label is associated with the plasma membrane of the cell. In one embodiment, the cell is a prokaryotic or eukaryotic cell. In another, embodiment, the cell is a mammalian cell. In some embodiments, the cell is an erythrocyte. In other embodiments, a plurality of membrane proteins each having extracellular domains covalently attached to the label are associated with the plasma membrane of the cell.

As used herein, the term "label" refers to a molecule or moiety having a property or characteristic that is capable of detection. Exemplary labels include but are not limited to luminescent agents, radioactive isotopes (e.g., $H^3$, $Ba^{133}$, $C^{14}$, $Ca^{45}$, $Cr^{51}$, $Cs^{137}$, $Eu^{152}$, $Fe^{59}$, $I^{125}$, $Ni^{63}$, $P^{32}$, $P^{33}$, $Ra^{226}$, $S^{35}$, technetium 99, thallium 201, $Xe^{133}$), stains, dyes, proteins, and enzymes.

The term "signal" refers to the property or characteristic of the label that permits it to be visually or instrumentally detected and/or distinguished. Exemplary signals include but are not limited to fluorescent signals, chemiluminescent signals, radioactive signals, chromogenic signals, and the like.

In some embodiments, the label is directly detectable ("directly detectable label"), as with, for example, fluorophores, radioisotopes, chemiluminophores, enzymes, colloidal particles, fluorescent microparticles and the like; or a label may be indirectly detectable ("indirectly detectable label"), as with, for example, specific binding members (e.g., a protein tag that binds a fluorogenic ligand (so-called fluorogen) and activates its fluorescence, wherein the fluorogenic ligand is nonfluorescent by its own and becomes fluorescent only upon binding its cognate tag; See e.g., U.S. Pat. No. 10,138,278; Plamont, M. et al., PNAS, 113:497-502 (2016), each of which is herein incorporated by reference in its entirety).

It will be understood that directly detectable labels may require additional components such as, for example, substrates, triggering reagents, light, and the like to enable detection of the label.

In some embodiments, the label is a directly detectable label.

When indirectly detectable labels are used, they can be used in combination with a specific binding member that is a directly detectable label or a "conjugate."

In some embodiments, the label is an indirectly detectable label that can be used in combination with a directly detectable label e.g., a fluorogenic ligand (so-called fluorogen).

A conjugate is typically a specific binding member which has been attached or coupled to a directly detectable label. Coupling chemistries for synthesizing a conjugate are well known in the art and can include, for example, any chemical and/or physical interaction/reaction that does not destroy the specific binding property of the specific binding member or the detectable property of the label.

As used herein, "specific binding member" refers to a member of a binding pair, i.e., two different molecules where one of the molecules through, for example, chemical or physical interactions specifically interacts with or binds to the other molecule. In addition to protein tag and fluorogenic ligand specific binding pairs (e.g., a protein tag that binds a fluorogen and activates its fluorescence, wherein the fluorogenic ligand is nonfluorescent by its own and becomes fluorescent only upon binding its cognate tag), other specific binding pairs include, but are not intended to be limited to, antigen and antibody; avidin and biotin; haptens and antibodies specific for haptens; complementary nucleotide sequences; enzyme cofactors or substrates and enzymes; and the like.

Exemplary binding pairs, i.e., two different molecules where one of the molecules through, for example, chemical or physical interactions specifically interacts with or binds to the other molecule and activates its fluorescence include but are not limited to those described by e.g., Schwartz, S. L. et al., ACS Chem. Biol., 10:539-546 (2015) (Epub. 2014 Nov. 24) and Szent-Gyorgyi, C. et al., Nat. Biotechnol., 26:235-240 (2008), each of which is incorporated by reference in its entirety. For example, fluorogen activating proteins (FAPs) are genetically expressible single-chain antibody fragments with molecular recognition properties for cognate dye partners termed fluorogens. Without wishing to be bound by any particular theory, it is believed that binding of fluorogen to the FAP restricts molecular rotations around double bonds in the fluorogen structure and results in significant enhancements in extinction coefficient and fluorescence quantum yield. Id. This process is fully reversible, and unbound fluorogen, even if previously bound, is essentially nonfluorescent. Id.

In some embodiments, the label is a small molecule.

The term "small molecule," as used herein, refers to a low molecular weight compound, which is not a polymer. The term encompasses molecules having a molecular weight of less than about 10,000 Daltons or less than about 9000 Daltons or less than about 8000 Daltons or less than about 7000 Daltons or less than about 6000 Daltons or less than about 5000 Daltons or less than about 4000 Daltons or less than about 3000 Daltons or less than about 2000 Daltons or less than about 1000 Daltons or less than about 900 Daltons or less than about 800 Daltons.

Luminescent labels emit light upon excitation by an external energy source and may be grouped into categories dependent upon the source of the exciting energy, including but not limited to fluorescent or photoluminescent labels that are excitable by units of electromagnetic radiation (photons) of infrared, visible, or ultraviolet light; radioluminescent labels deriving energy from high energy particles; chemiluminescent labels that obtain energy from chemical reactions; and bioluminescent labels wherein the exciting energy is supplied in a biological system.

Fluorophores include, but are not limited to BODIPY, fluorescein, fluorescein substitutes (Alexa Fluor dye, Oregon green dye), long wavelength dyes, and UV-excited fluorophores. These and additional fluorophores are listed in Fluorescent and Luminescent Probes for Biological Activity, A Practical Guide to Technology for Quantitative Real-Time Analysis, Second Ed. W. T. Mason, ed. Academic Press (1999) (herein incorporated by reference).

In some embodiments, the label is a fluorescent label.

Methods and devices for detecting fluorescence are known in the art and the fluorescence may be measured by a number of different modes including but not limited to fluorescence intensity, lifetime, and anisotropy e.g., in either steady state or kinetic rate change modes.

In some embodiments, the label is 4-fluoro-7-nitrobenzofurazan (NBD-F), 4-chloro-7-nitrobenzofurazan (NBD-Cl), 4-fluoro-7-nitro-[2,1,3]-benzoxadiazole (NBD), 5(6)-carboxyfluorescein N-hydroxysuccinimide ester (Fluorescein) or 5(6)-carboxytetramethylrhodamine N-succinimidyl ester (TAMRA).

In one embodiment, the label is 4-fluoro-7-nitrobenzofurazan (NBD-F).

In some embodiments, the lipid-based structure is a cell ghost, a liposomal vesicle, an extracellular vesicle (EV), or particle, wherein the label is a fluorescent label, and wherein the membrane portion(s) is/are derived from a eukaryotic cell. In one embodiment, the eukaryotic cell is an erythrocyte.

In other aspects, the present invention provides a composition the cells and/or lipid-based structures described herein.

In still further aspects, the present invention provides a kit comprising the cells and/or lipid-based structures described herein, along with instructions for use.

Methods for Preparing

In other aspects, the present invention provides a method for preparing a lipid-based structure, the method comprising:

covalently attaching a label to an extracellular domain of at least one membrane protein associated with a plasma membrane of a cell; and providing a lipid bilayer having a membrane portion derived from the plasma membrane of the cell, wherein the lipid bilayer isolates an interior space of the structure from an external environment.

In some embodiments, the at least one membrane protein is associated with the membrane portion. In this manner, the structure comprises the membrane portion derived from the plasma membrane, wherein the lipid bilayer isolates the interior space of the structure from the external environment, wherein the at least one membrane protein is associated with the membrane portion.

The label can be covalently attached to the extracellular domain of the at least one membrane protein by methods described herein and/or known in the art.

In one embodiment, the covalently attaching step comprises contacting the cell with the label under a condition sufficient to attach the label to the extracellular domain of the at least one membrane protein associated with the plasma membrane of the cell.

In another embodiment, the label comprises a reactive moiety that can react with a protein to covalently attach the label to the protein. In this manner, the covalent attachment of the label to the protein is non-specific as it does not involve e.g., specific recognition/binding interactions, such as e.g., antibody/target, receptor/ligand, and the like interactions.

A variety of reactive moieties are known in the art for covalently attaching a label to a protein. In some embodiments, the reactive moiety can be a chemical group that reacts with an amino acid, protein, and/or peptide. As used herein, "amine reactive moiety" refers to a moiety that reacts with an amine group. As used herein, "thiol reactive moiety" refers to a moiety reacts with a thiol (or thiol group) (also referred to as a sulfhydryl (sulfhydryl group)).

Some non-limiting examples of reactive moiety include N-hydroxysuccinimide (NHS) esters (amine reactive), N-hydroxysulfosuccinimide (sulfo-NHS) esters (amine reactive), succinimidyl acetylthioacetate (SATA), carbodiimides (amine and carboxyl reactive), hydroxymethyl phosphines (amine reactive), maleimides (thiol reactive), aryl azides (primary amine reactive), pentafluorophenyl (PFP) esters (amine reactive), imidoesters (amine reactive), isocyanates (hydroxyl reactive), vinyl sulfones (reacts with amines and hydroxyls), pyridyl disulfides (reacts with thiols), and the like.

Exemplary amine reactive moieties include but are not limited to an acetimidate, acyl azide, aldehyde, anhydride, aryl halide, carbodiimide, carbonate, epoxide, fluorophenyl ester, glyoxal, imidoester, isocyanate, isothiocyanate, N-hydroxysuccinimide ester (NETS ester), sulfonyl chloride, sulfo-N-hydroxysuccinimide ester (sulfo-NHS ester; having a structure identical to NETS esters but containing a sulfonate group on the N-hydroxysuccinimide ring), halogenated dinitrobenzene, and the like.

In one embodiment, the covalently attaching step comprises contacting the cell with the label under a condition sufficient to attach the label to the extracellular domain of the at least one membrane protein associated with the plasma membrane of the cell, wherein the label comprises a reactive moiety.

In one embodiment, the reactive moiety is an amine reactive moiety.

In another embodiment, the label is a fluorescent label comprising the reactive moiety.

In some embodiments, the label is a fluorophore comprising the reactive moiety.

In other embodiments, the label is 4-fluoro-7-nitrobenzofurazan (NBD-F).

In one embodiment, the providing step comprises preparing a cell ghost comprising the lipid bilayer having the membrane portion derived from the plasma membrane of the cell, wherein the lipid bilayer isolates the interior space of the structure from the external environment.

In some embodiments, the at least one membrane protein is associated with the membrane portion of the lipid bilayer of the ghost. In this manner, the cell ghost comprises the membrane portion derived from the plasma membrane, wherein the lipid bilayer isolates the interior space of the cell ghost from the external environment, wherein the at least one membrane protein is associated with the membrane portion.

In one embodiment, the preparing the cell ghost step comprises removing intracellular contents of the cell.

In some embodiments, the removing step comprising lysing the cell.

In another embodiment, the lysing step comprises hypotonic lysis of the cell.

In other embodiments, the preparing the cell ghost step further comprises re-sealing the cell's plasma membrane following the removing step (e.g., after lysing), thereby forming the cell ghost having the interior space isolated from the external environment.

In other embodiments, the cell is an erythrocyte, wherein the lipid-based structure is an erythrocyte ghost.

In one embodiment, the providing step comprises preparing a liposomal vesicle comprising the lipid bilayer having the membrane portion derived from the plasma membrane of the cell, wherein the lipid bilayer isolates the interior space of the liposomal vesicle from the external environment.

In some embodiments, the at least one membrane protein is associated with the membrane portion of the lipid bilayer of the liposomal vesicle. In this manner, the liposomal vesicle comprises the membrane portion derived from the plasma membrane, wherein the lipid bilayer isolates the interior space of the liposomal vesicle from the external environment, wherein the at least one membrane protein is associated with the membrane portion.

In some embodiments, the preparing the liposomal vesicle step comprises
preparing a cell ghost as described herein; and
subjecting the cell ghost to one or more liposomal vesicle forming steps to obtain the liposomal vesicle.

In one embodiment, the one or more liposomal vesicle forming steps can include passing the cell ghost through an extruder to form the liposomal vesicle.

In some embodiments, the cells are eukaryotic cell.

In some embodiments, the cells are erythrocyte.

In other embodiments, the method further comprises contacting the structure with a particle to at least partially surround the particle with the lipid bilayer.

The particle can be any particle suitable for encapsulation with a lipid-bilayer e.g., a particle as described herein and/or known in the art. For example, in some embodiments, the particle is a particle synthesized using a one-pot free radical precipitation polymerization as disclosed by Bishop, B. M. et al., PLoS One, 10(2):e0117394 (2015), which is herein incorporated by reference in its entirety.

In one embodiment, the liposomal vesicle of the invention can be incubated with the particle to form an encapsulated particle.

In other embodiments, total cellular membranes can be prepared from homogenization of lysed cells (e.g., lysed RBCs or other cells), followed by probe sonication to obtain SUVs sufficient for fusion and display as single lipid bilayers on the particles.

In another embodiment, appropriate vesicles could be formed for fusion and display as single lipid bilayers on the particles by mixing detergent-solubilized membrane components with synthetic vesicles and removing the detergent through dialysis.

In other embodiments, the encapsulation of synthetic nanoparticles within cellular membranes can be achieved by taking advantage of natural cellular processes where non-degradable particles are first internalized by cells through endocytosis and subsequently released from the cells in a vesicle-enclosed form. Using this approach, various membrane-coated hybrid nanoparticles can be produced including magnetic, magnetic-metallic and magnetic-fluorescent particles. These hybrid nanoparticles can combine the advantageous properties of each integrant component and can represent useful platforms for nanotheronostics.

In some embodiments, intact cellular membranes can be collected and then coated on the particles. For example, in one embodiment, to formulate RBC membrane-coated polymeric nanoparticles, polymeric cores and RBC membrane-derived vesicles can first be prepared by nanoprecipitation and mechanical extrusion, respectively. The two components can then be mixed and extruded together, forcing the adsorption of RBC membranes onto the surface of polymeric cores.

In other embodiments, cell membranes can spontaneously fuse onto inorganic nanoparticles by external mechanical forces to form cell membrane-coated inorganic nanoparticles (e.g., RBC membrane-coated AuNPs (RBC-AuNPs)). For example, inorganic gold nanoparticles (AuNPs) have found widespread applications as imaging agents and drug carriers in biology and medicine. Their modification using the entirety of a cell membrane or portions thereof can provide improved functions and advanced biomimetic features.

In one embodiment, the providing step comprises obtaining an extracellular vesicle (EV) produced by the cells, wherein the EV comprises the lipid bilayer having the membrane portion derived from the plasma membrane of the cell, wherein the lipid bilayer isolates the interior space of the EV from the external environment.

In some embodiments, the at least one membrane protein is associated with the membrane portion of the lipid bilayer of the EV. In this manner, the EV comprises the membrane portion derived from the plasma membrane, wherein the lipid bilayer isolates the interior space of the EV from the external environment, wherein the at least one membrane protein is associated with the membrane portion.

In some embodiments, the EV is an exosome or a microvesicle.

In another embodiment, the EV comprises a virus particle.

In another embodiment, the obtaining step comprises isolating or purifying the EV.

Isolation and/or purification of EV populations from different sources may be carried out by one of ordinary skill in the art using a variety of methods and techniques, including but not limited to from malignant effusions and the peripheral blood of cancer patients and from supernatants of in vitro cultivated cell lines and tumor cells, etc. These methods include but are not limited to differential centrifugation, including but not limited to an ultracentrifugation step, affinity chromatography, polymer-mediated precipitation (e.g., using polyethylene glycol (PEG) of different molecular weights, including the Total Exosome Isolation Reagents from Life Technologies Corporation (U.S. Pat. No. 8,901,284, which is herein incorporated by reference) and ExoQuick™ (US2013/0337440A1, which is herein incorporated by reference)), and capture on defined pore-size membranes, such as e.g., ExoMir™, which typically uses two filters of different pore-sizes connected in series (US2013/0052647A1, which is herein incorporated by reference).

In other embodiments, the cells and/or lipid-based structures of the present invention, including the fully encapsulated and/or at least partially surrounded particles, may be enriched for cells and/or lipid-based structures displaying membrane components with the desired orientation.

In some embodiments, at least some or all membrane portions have the same orientation as in the intact, whole cell. It will be appreciated that some membrane portions may have the same orientation as in the intact, whole cell, while others may have the opposite orientation as in the intact, whole cell. By opposite orientation, it is meant that membrane components that would be oriented external to the cellular compartment in the intact, whole cell are internal and face the inside or interior of the lipid-based structure (e.g., solvent inaccessible).

By way of example and without limitation, one of the methods that could be used to enrich for lipid-based structures displaying the membrane component in the same external orientation as in the native cell (which could then be used to coat particles with the desired external orientation for the membrane component), could be immunoaffinity chromatography to isolated structures displaying externally-exposed membrane components. In other embodiments, immunoaffinity purification could be used to enrich for structures of the desired or appropriate orientation using antibodies directed against various components of the membranes. In some embodiments, the lipid-based structures may preferably be strictly uniform in geometry and protein content, or both.

Accordingly, in one embodiment, the methods for preparing the structures further comprise enriching for cells and/or lipid-based structures displaying membrane components with a desired orientation.

In some embodiment, enriching step provides for structures having at least about 5%, 10%, 20%, 30%, 40%, 50%, 60%, 70%, 80% or 90% of the membrane portions of the structure having the same external orientation as in the cell from which they are derived from.

In other aspects, the present invention provides a method for preparing a cell, the method comprising covalently attaching a label to an extracellular domain of at least one membrane protein associated with a plasma membrane of the cell as described herein.

In one embodiment, the covalently attaching step comprises contacting the cell with the label under a condition sufficient to attach the label to the extracellular domain of the at least one membrane protein associated with the plasma membrane of the cell.

In another embodiment, the label comprises a reactive moiety that can react with a protein to covalently attach the label to the protein.

In one embodiment, the reactive moiety is an amine reactive moiety.

In another embodiment, the label is a fluorescent label comprising the reactive moiety.

In some embodiments, the label is a fluorophore comprising the reactive moiety.

In other embodiments, the label is 4-fluoro-7-nitrobenzofurazan (NBD-F).

In other aspects, the present invention provides cells and/or lipid-based structures prepared by the methods described herein.

Methods for Use

In other aspects, the present invention provides a method for determining membrane orientation of a lipid-based structure, the method comprising:
determining an amount of a signal emitted by a label from a test sample comprising the structure, whereby an amount of quenching of the signal is indicative of the orientation of the membrane portion, wherein the structure comprises a lipid bilayer having a membrane portion derived from a plasma membrane of a cell, wherein the lipid bilayer isolates an interior space of the structure from an external environment, wherein at least one membrane protein having an extracellular domain covalently attached to a label is associated with the plasma membrane of the cell.

In some embodiments, the at least one membrane protein is associated with the membrane portion.

In other embodiments, the detection of a signal or quenching of a signal may be quantitative and/or qualitative.

In one embodiment, results can be normalized values against appropriate controls to obtain fold or percent changes.

Quenching can be determined or measured by methods described herein and/or that are known in the art. Quenching or a quenching condition can include at least one quenching agent. The quenching agent can be any chemical, compound or biological molecule that can cause quenching of a signal, either alone or in combination with other agents or factors. Quenching can be used, for example, to determine and/or measure the solvent accessibility of the label.

In some embodiments, a quenching agent (quencher) may be a molecule that absorbs the energy of an excited fluorophore. Without wishing to be bound by any particular theory, it is believed that proximity of a fluorophore and a quencher allow for the energy to be transferred from the fluorophore to the quencher. For example, by absorbing this energy, the quencher prevents the fluorophore from releasing the energy in the form of a photon, thereby preventing fluorescence.

In other embodiments, quenching agents may be categorized as non-fluorescent and fluorescent quenchers. Non-fluorescent quenchers can quench the fluorescence of a wide variety of fluorophores. Some non-fluorescent quenchers absorb energy from the fluorophore and release the energy as heat. Examples of non-fluorescent quenchers include but are not limited to sodium dithionite ($Na_2S_2O_4$), 4-(4'-dimethylaminophenylazo)benzoic acid) (DABCYL), QSY-7, and QSY-33.

Fluorescent quenchers tend to be specific to fluorophores that emit at a specific wavelength range. Fluorescent quenchers can involve fluorescence resonance energy transfer (FRET). In some cases, the fluorescent quencher molecule is also a fluorophore. In such cases, proximity of the fluorophore and fluorescent quencher is indicated by a decrease in fluorescence of the fluorophore and an increase in fluorescence of the fluorescent quencher. Commonly used fluorescent fluorophore pairs (fluorophore/fluorescent quencher) include e.g., fluorescein/tetramethylrhodamine, IAEDANS/fluorescein, fluorescein/fluorescein, and BODIPY FL/BODIPY FL.

In some embodiments, the quenching agent is substantially membrane impermeable and therefore is selective for surface proteins facing the external environment by being membrane impermeable, thereby avoiding quenching of label facing the cytosol or the inside of a lipid-based structure. In one embodiment, the quenching agent does not penetrate a lipid bilayer. In another embodiment, the quenching agent possesses an overall charge that increases the hydrophilicity of the quenching agent and prevents the quenching agent from passing through a hydrophobic lipid bilayer of a plasma membrane or bilayers comprising membrane portions derived therefrom. In other embodiments, the quenching agent may contain one or more substituents covalently attached to the quenching agent for conferring a hydrophilic characteristic to the quenching agent.

In one embodiment, the label is a fluorescent label.

In another embodiment, the label is 4-fluoro-7-nitrobenzofurazan (NBD-F).

In some embodiments, the amount of quenching is determined using a quenching agent.

In another embodiment, the quenching agent is sodium dithionite ($Na_2S_2O_4$).

In one embodiment, the amount of the signal emitted by the label from the test sample is fully quenchable, thereby indicating that the membrane portion of the structure mimics the orientation found on the native cell with the label on the outside of the structure (facing the external environment).

In one embodiment, the amount of the signal emitted by the label from the test sample is partially quenchable, thereby indicating that the membrane portion of the structure does not mimic the orientation found on the native cell with the label facing the inside of the structure.

In one embodiment, the method further comprises contacting the structure with a quenching agent under a quenching condition to determine the amount of quenching.

In another embodiment, the label is 4-fluoro-7-nitrobenzofurazan (NBD-F) and the quenching agent is sodium dithionite ($Na_2S_2O_4$).

In another embodiment, the method further comprises comparing the amount of signal emitted from the test sample comprising the structure with an amount of signal emitted from a reference sample comprising a reference structure, whereby reduced signal emission from the test sample as compared to signal emission from the reference sample is indicative of reduced membrane coverage of the structure relative to membrane coverage of the reference structure.

In some embodiments, reduced membrane coverage is indicative of loss of a protein from the membrane portion.

In some embodiments, the method further comprises covalently attaching the label to the extracellular domain of the at least one membrane protein associated with the plasma membrane of the cell.

In some embodiments, the reference structure is the cell.

In another embodiment, the label is 4-fluoro-7-nitrobenzofurazan (NBD-F) and the quenching agent is sodium dithionite ($Na_2S_2O_4$).

In other aspects, the present invention provides a method for determining membrane coverage of a lipid-based structure, the method comprising:

comparing the amount of a signal emitted by a label from a test sample comprising the structure with an amount of a signal emitted from a reference sample comprising a reference structure, whereby a reduced signal emission from the test sample as compared to signal emission from the reference sample is indicative of a reduced membrane coverage of the structure relative to membrane coverage of the reference structure, wherein the structure comprises a lipid bilayer having a membrane portion derived from a plasma membrane of a cell, wherein the lipid bilayer isolates an interior space of the structure from an external environment, wherein at least one membrane protein having an extracellular domain covalently attached to a label is associated with the plasma membrane of the cell.

In some embodiments, the at least one membrane protein is associated with the membrane portion.

In some embodiments, the reference structure is the cell.

In another embodiment, the label is 4-fluoro-7-nitrobenzofurazan (NBD-F) and the quenching agent is sodium dithionite ($Na_2S_2O_4$).

In one aspect, the present invention provides a method for monitoring whether the polarity of a host membrane is preserved during preparation of a lipid-based structure, the method comprising:

covalently attaching a label to an extracellular domain of a plasma membrane protein of a plasma membrane of a cell;

preparing the lipid-based structure, wherein the structure comprises a lipid bilayer having a membrane portion derived from a plasma membrane of a cell, wherein the lipid bilayer isolates an interior space of the structure from an external environment, wherein at least one membrane protein having an extracellular domain covalently attached to a label is associated with the plasma membrane of the cell; and determining an amount of a signal emitted by the label from a test sample comprising the structure, whereby an amount of quenching of the signal is indicative of the orientation of the membrane portion.

In some embodiments, the at least one membrane protein is associated with the membrane portion.

Accordingly, in still further aspects and embodiments, the present invention provides methods for assessing, monitoring, and/or validating whether membrane orientation is preserved during ghosts and/or vesicle preparations (e.g., including, but not limited to, cell ghosts, liposomal vesicles, membrane-encapsulated microparticles, EVs, and the like) incorporating elements of cellular membranes and associated proteins. In some embodiments, the determinations made with the lipid-based structures can be extrapolated to and/or validate the same cell ghost and/or vesicle preparation method that does not have the covalently attached label.

In other aspects, the present invention provides a method for determining whether an agent impacts membrane orientation, the method comprising:

introducing the agent to:
a cell, wherein at least one membrane protein having an extracellular domain covalently attached to a label is associated with a plasma membrane of the cell; or
a lipid-based structure, wherein the lipid-based structure comprises a lipid bilayer having a membrane portion derived from the plasma membrane of the cell, wherein the lipid bilayer isolates an interior space of the structure from an external environment; and determining an amount of a signal emitted by the label from a test sample comprising the cell or the lipid-based structure, whereby an amount of quenching of the signal is indicative of the impact of the agent on membrane orientation.

In some embodiments, the at least one membrane protein is associated with the membrane portion.

In some embodiments, the cell is an intact, whole cell.

In other embodiments, the cell is a cultured cell.

In other embodiments, the lipid-based structure is an EV shed from the cell.

In one embodiment, the EV is an exosome or virus particle.

In some embodiments, the method is a high throughput screening method.

In one embodiment, the agent is a drug.

In another embodiment, agent is capable of effecting pH of a solution.

In other embodiments, the introducing step comprises adding the agent to a composition comprising the cell or lipid-based structure.

In one embodiment, the composition is a culture medium.

In some embodiments, the agent contacts the cell or the lipid-based structure following the introducing step.

In some embodiments, the agent changes the pH of the composition comprising the cell or the lipid-based structure.

In some embodiments, the method further comprises
covalently attaching the label to the extracellular domain of the at least one membrane protein associated with the plasma membrane of the cell.

In one embodiment, the amount of the signal emitted by the label from the test sample is fully quenchable, thereby indicating that the agent does not impact membrane orientation of the cell or the lipid-based structure.

For example, in some embodiments, the amount of the signal emitted by the label from the test sample is fully quenchable, thereby indicating that the plasma membrane or membrane portion mimics the orientation prior to the introducing step i.e., with the label facing the external environment of the cell or the lipid-based structure.

In one embodiment, the amount of the signal emitted by the label from the test sample is partially quenchable, thereby indicating that the agent impacts membrane orientation of the cell or the lipid-based structure.

For example, in some embodiments, the amount of the signal emitted by the label from the test sample is not fully quenchable, thereby indicating that the plasma membrane or membrane portion does not mimic the orientation prior to the introducing step i.e., with the label facing the inside or interior space of the cell or the lipid-based structure.

In one embodiment, the method further comprises
contacting the cell or the lipid-based structure with a quenching agent under a quenching condition to determine the amount of quenching.

In another embodiment, the label is 4-fluoro-7-nitrobenzofurazan (NBD-F) and the quenching agent is sodium dithionite ($Na_2S_2O_4$).

The invention will be further described in the following examples, which do not limit the scope of the invention described in the claims.

EXAMPLES

Example 1

Preparation of Erythrocytes

Pooled *Ovis aries* (sheep) erythrocytes suspended in Alsever's solution were purchased from Carolina biological supply in three shipments (50 mL each). Erythrocytes were pelleted by centrifuging the blood at 5000 g force, the supernatant discarded, and then resuspended in twice the volume of Thermo Dulbecco's Phosphate Buffer Saline without Calcium or Magnesium (DPBS) as a wash step. Cells were then centrifuged again at 5000 g, collected, and resuspended in DPBS. At this point, 0.5 mL of resuspended cells was set aside for future characterization. The remaining cells were washed again in DPBS and placed in a 38° C. water bath for 2.5 hours.

For fluorescent labeling of erythrocytes, 4-Fluoro-7-nitrobenzofurazan (NBD-F, 0.109 mM in HPLC-grade ethanol) was added to the tube and inverted gently to mix before being placed back in the 38° C. water bath for 2.5 hours. Following incubation, cells were spun down at 5000 g and washed twice with DPBS. Each of the supernatants was saved, along with 0.5 mL of the fully washed cells, for future characterization.

Example 2

Preparation of Erythrocyte Ghosts

Washed erythrocytes were spun at 15 000 g force for 20 minutes, the supernatant saved, and cells resuspended in 10 mM phosphate buffer (pH 7.4) for hypotonic lysis of cells. Cells were spun down again at 15 000 g force for 20 minutes, supernatant saved for analysis to detect and quantify released hemoglobin, and the cells resuspended again in hypotonic buffer. This procedure was repeated until a stable minimum hemoglobin concentration in the supernatant was achieved. The resulting erythrocyte ghost membranes (ghosts) were finally resuspended in DPBS and stored in 4° C.

Example 3

Preparation of Erythrocyte Liposomes and Erythrocyte Encapsulated Microparticles (Lipobeads)

Erythrocyte ghosts in DPBS were extruded using 50 nM T&T Scientific extruders and Hamilton gas-tight glass syringes. After 11 required passes through the extruder, 1.5 mL of erythrocyte liposomes were incubated with 5 mg of previously synthesized core particles overnight on a tube rotator at room temperature. The tubes were then centrifuged at 3000 g force for 10 minutes and the supernatant was set aside for later analysis. The pelleted lipobeads were resuspended in 1 mL of DPBS by trituration and stored at 4° C. until further use.

Example 4

Dynamic Light Scattering (DLS) on Microparticles Using Multi Angle Light Scattering (MALS)

A 1.5 μL aliquot of suspended particles was diluted into 3 mL of (0.01 M DPBS, pH 7.4) in a clear plastic cuvette. The cuvette was then capped and gently inverted to mix. The cuvette was placed in a Beckman Coulter N5 Submicron Particle Size Analyzer to establish the statistical average particle diameter using an empirically determined rate of diffusion, or diffusion coefficient, based on the temperature and viscosity of the diluent. The Stokes-Einstein equation is then used with the diffusion coefficient to determine particle size (Patanarut, A., et al., Colloids Surf., A 2010, 362, 8-19). The diluent was set to pH 7.4, 0.1 M Phosphate, with a refractive index (RI) of 0.797, and a diluent viscosity (cP) of 1.33 at 37° C. Each sample was analyzed at 11.1°, 15.7°, 23.0c % 30.2°, 62.6°, and 90.0° angles with ten repetitions per angle, with a 5-minute equilibration time, and 85 second runs (Table 1).

TABLE 1

Summary of MALS diameters for erythrocytes, erythrocyte ghosts, liposomes, microparticle cores, and, liposome-encapsulated microparticles. Reported values at varying angles use ten repetitions per average value and standard deviation.

| | Angle (°) | | | | | | | | | | | |
|---|---|---|---|---|---|---|---|---|---|---|---|---|
| | 11° | σdev | 15.7° | σdev | 23° | σdev | 30.2° | σdev | 62.6° | σdev | 90° | σdev |
| Unlabeled Erythrocytes | 51.00 | 6.19 | 157.01 | 10.91 | 832.94 | 206.02 | 1425.61 | 312.06 | 5946.73 | 1304.68 | 2289.24 | 351.77 |
| NBD-F-labeled Erythrocytes | | | | | | | | | | | | |
| Unlabeled Erythrocyte ghosts | 493.24 | 31.24 | 702.51 | 162.74 | 1140.59 | 75.06 | 1517.30 | 660.08 | 1237.90 | 2077.16 | 362.93 | 21.27 |
| NBD-F-labeled Erythrocytes ghosts | 189.71 | 8.86 | 391.83 | 19.71 | 634.38 | 156.64 | 373.44 | 16.83 | 275.99 | 3.57 | 248.43 | 2.71 |
| Unlabeled Erythrocyte liposomes | 368.84 | 123.92 | 463.02 | 123.66 | 489.98 | 150.93 | 479.99 | 136.46 | 254.52 | 55.97 | 236.43 | 39.89 |
| NBD-F-labeled Erythrocytes liposomes | 343.25 | 35.27 | 575.54 | 22.65 | 388.19 | 49.93 | 432.14 | 15.81 | 292.80 | 5.95 | 249.57 | 4.84 |
| N79P37 microparticles | 131.92 | 16.94 | 257.50 | 21.62 | 702.52 | 101.14 | 426.41 | 81.11 | 690.07 | 173.65 | 525.21 | 70.67 |
| Unlabeled Erythrocyte-encapsulated microparticles | 672.83 | 133.77 | 2057.96 | 333.90 | 5379.53 | 668.74 | 12209.20 | 1303.99 | 35215.43 | 18871.32 | 13890.51 | 4761.30 |

TABLE 1-continued

Summary of MALS diameters for erythrocytes, erythrocyte ghosts, liposomes, microparticle cores, and, liposome-encapsulated microparticles. Reported values at varying angles use ten repetitions per average value and standard deviation.

| | Angle (°) | | | | | | | | | | | |
|---|---|---|---|---|---|---|---|---|---|---|---|---|
| | 11° | σdev | 15.7° | σdev | 23° | σdev | 30.2° | σdev | 62.6° | σdev | 90° | σdev |
| NBD-F-labeled Erythrocytes-encapsulated microparticles | 425.16 | 58.21 | 1070.11 | 218.54 | 2723.67 | 329.07 | 6473.89 | 670.37 | 25147.38 | 12820.77 | 4057.80 | 1989.68 |

Example 5

Fluorescence Microscopy of Erythrocytes and Erythrocyte Membranes/Ghosts 1.5 µL of the sample being analyzed was placed on a glass slide and glass coverslip. The edges were sealed with clear nail polish and left to dry for approximately ten minutes. The glass slide was then placed on the Biotek Cytation 5 imager slide holder and imaged in bright field and green-fluorescent protein (GFP) channels for non-fluorescent and fluorescent images respectively.

Unlabeled sheep erythrocytes showed expected oblong shape and indented center that showed a lack of nuclei (FIG. 1A). NBD-F-labeled erythrocytes showed similar shape unlabeled erythrocytes in bright field settings (FIG. 1B). Furthermore, NBD-F erythrocytes showed successful labeling with the fluorophore (FIG. 1C, 1D). As erythrocyte ghosting procedures were utilized that hypotonically lyse cells without disrupting cell membrane integrity, erythrocyte "ghosts" no longer contained internal cell components seen in original erythrocyte cells (FIG. 1E, F, G), and were not seen to have compromised membrane integrity indicated by the non-linearized shape of the cell membrane ghosts. Digital phase contrast settings elucidated greater detail of erythrocyte ghosts under bright field settings (FIG. 1H), allowing for a more precise comparison with the fluorescence channel (FIG. 1I, J).

Example 6

Fluorescence Quenching Assays

Analyses were prepared in triplicate in a Greiner black, top-read, 96-well plate with flat bottom, with each replicate including 100 µL of the sample being analyzed. The plate was read using a Biotek Cytation 5 plate reader with the monochromator set to 470 nm excitation and 530 nm emission wavelengths.

Kinetic assays were performed after a 10 second shake, for 20-minute durations, at 17 reads per well, and 1:12 minutes per read. After establishing the baseline read, 5 µL sodium dithionite ($Na_2S_2O_4$, 0.4M) was added to each well to quench the exposed NBD-F fluorophore. The 20-minute kinetic assay was repeated. Finally, 5 µL of Triton X-100 (5% v/v) was added to each well to disrupt membranes and free any remaining fluorophore that was internalized. The final 20-minute kinetic assay was recorded, and data was normalized by averaging the fluorescence reads of the blank row and subtracting the value from the sample value using Cytation software version 3.03.14. The resulting triplicate reads were graphed using GraphPad Prism 5.0 and error bars shown are Standard Deviation (SD) from the mean of the triplicates.

Quenching of DPBS+4% NBD-F served as a control to indicate quenching efficiency of $Na_2S_2O_4$. Baseline fluorescence intensity of both NBD-F-labeled erythrocytes (dark blue, red and purple lines) and erythrocyte ghosts (lighter blue, orange and lavender lines) were significantly higher than fluorescence intensities of unlabeled erythrocytes and erythrocyte ghosts (black lines) (FIG. 2). Quenching of intact NBD-F labeled erythrocytes was seen upon addition of $Na_2S_2O_4$. Addition of Triton X-100 did not cause significant membrane disruption, as indicated by the lack of fluorescence intensity perturbation after quenching.

As shown in FIG. 2A, Dulbecco's Phosphate-Buffered Saline (DPBS) with 4% (v/v) 4-Fluoro-7-nitrobenzofurazan (NBD-F) added, NBD-F-labeled erythrocytes, and resulting NBD-F ghost membranes, all showed quenching upon 0.4 M Sodium Dithionite ($Na_2S_2O_4$) addition. NBD-F-labeled erythrocytes were fully quenchable due to the labeling of proteins on the external surface of the cell membrane. Quenching of the NBD-F erythrocytes indicated the accessible outer membrane location of the NBD-F fluorophore label. Prolonged fluorescence intensity prior to quenching orthogonally confirmed microscopy images that indicate that erythrocytes were successfully labeled by the NBD-F fluorophore. In contrast, DPBS and unlabeled erythrocytes did not show detectable fluorescence intensity at the 470/530 nm Excitation/Emission wavelengths specific for the NBD-F fluorophore.

NBD-F-labeled erythrocyte ghosts showed similar quenching upon 0.4 M $Na_2S_2O_4$ addition, whereas unlabeled erythrocyte ghosts did not show any quenching as expected. The quenching of NBD-F-labeled erythrocyte ghosts indicated that the cell membranes had not flipped, or undergo reversal, during the hypotonicity-based cell lysis process that emptied the intracellular contents of erythrocytes while leaving membranes intact.

Figure 2B:
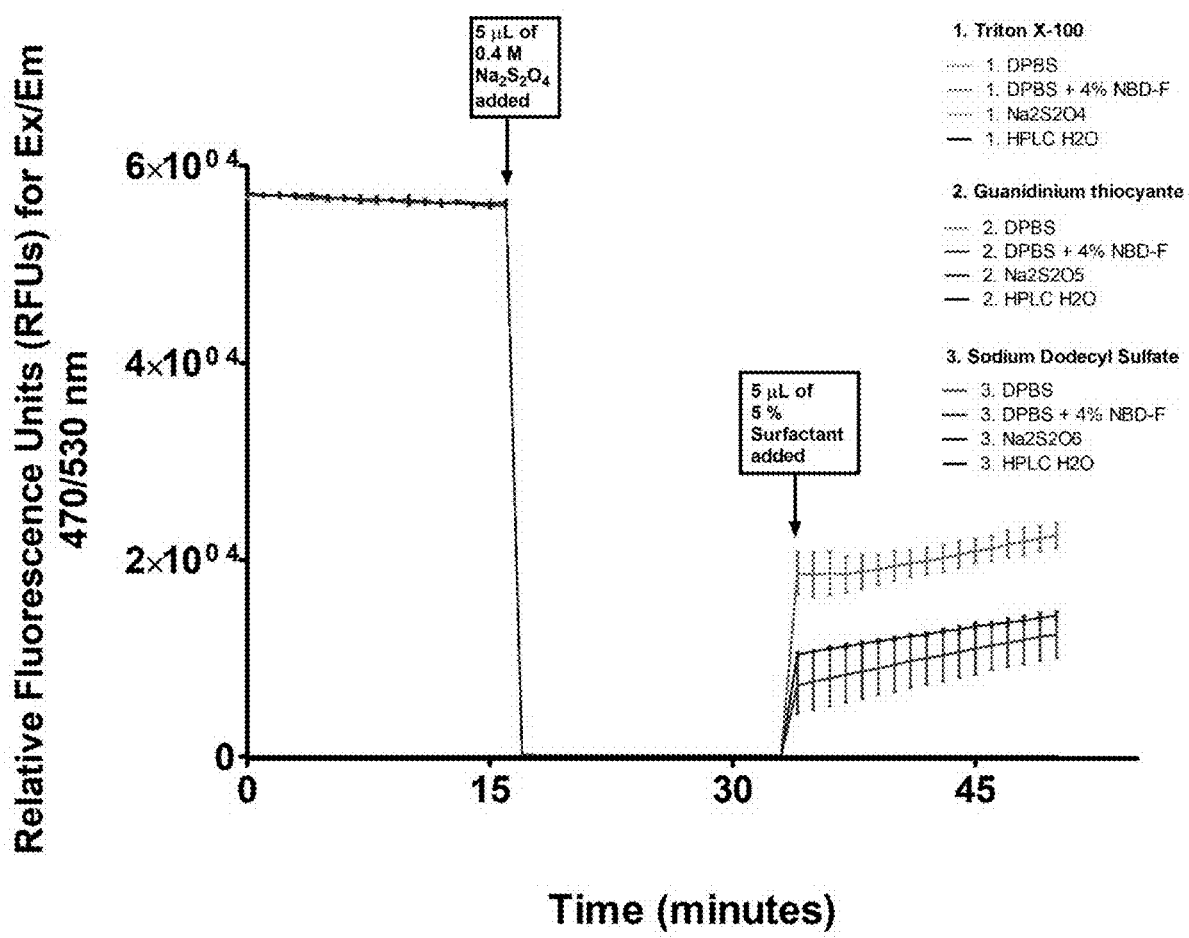

As shown in FIG. 2B, microparticles used for incubation with both unlabeled and NBD-F-labeled erythrocyte vesicles did not respond to the addition of 0.4 M $Na_2S_2O_4$ at the 20-minute time point, as there was no fluorophore attached to the particle architecture. Unlabeled erythrocyte-encapsulated microparticles showed higher baseline fluorescence than free microparticles, indicating that the addition of an erythrocyte membrane layer increased fluorescence of final membrane-encapsulated microparticle. Unlabeled erythrocyte-encapsulated microparticles showed slight quenching upon $Na_2S_2O_4$ addition. In contrast, NBD-F-labeled erythrocyte-encapsulated microparticles exhibited more than 2-fold increase in baseline fluorescence compared to free microparticles and underwent significant quenching upon $Na_2S_2O_4$ addition. Significant quenching experienced by NBD-F-labeled erythrocyte-encapsulated microparticles indicated that the proteins that were initially labeled on the outer leaflet of the erythrocyte membrane were not reversed during cell lysis, vesicle preparation via extrusion, and finally fusion onto the microparticle surface.

Fluorophore Labeling and Quenching-based determination of Membrane Coverage and Orientation (FLAQ-MCO) was used to monitor the final orientation of the erythrocyte membranes upon fusion onto the microparticles used. Given readily detectable fluorescence of fluorophore-labeled erythrocyte cells, ghost membranes, and erythrocyte-encapsulated microparticles, the FLAQ system was shown as a viable tool for assessing the quality of engineered membrane-encapsulated microparticles. Furthermore, the membrane coverage and proper orientation was shown with the full quenching of the fluorophore tag on the cell, ghost membrane, as well as membrane-encapsulated microparticle surfaces.

Fluorophore Labeling and Quenching for determination of Membrane Coverage and protein Orientation (FLAQ-MCO) was used to monitor whether the polarity of the host membrane is preserved during the preparation of microparticles encapsulated by cellular membrane components. Fluorophore-labeling of intact erythrocytes (as a model) prior to liposome preparation allows for tagging exposed protein surfaces on the exterior of the cell membrane. We then monitor solvent accessibility of the fluorophore label (i.e., NBD-F) using a fluorophore-specific quencher (i.e., NBD-F is quenched using sodium dithionite), assessing each step of the synthetic process from beginning to end (i.e. from intact cells to membrane-encapsulated particles). This approach is more versatile and captures a wider variety of cell surface proteins than is readily achievable using antibody-based approaches.

We claim:

1. A lipid-based structure comprising a lipid bilayer having a membrane portion derived from a plasma membrane of a cell and comprising a protein,
   wherein the lipid bilayer isolates an interior space of the structure from an external environment,
   wherein the protein of the membrane portion has the same orientation found on the plasma membrane of the cell with the protein,
   wherein the protein has an extracellular domain covalently attached to a label, and
   wherein the label is a fluorescent label.

2. The structure of claim 1, wherein the structure further comprises a particle at least partially surrounded by the lipid bilayer.

3. The structure of claim 1, wherein the label is 4-fluoro-7-nitrobenzofurazan (NBD-F).

4. A composition comprising the lipid-based structure of claim 1.

5. A kit comprising the lipid-based structure of claim 1; and instructions for use.

* * * * *